July 24, 1962 H. E. WHITLOCK 3,046,263
COAGULATION OF COLLOIDAL POLYTETRAFLUOROETHYLENE DISPERSIONS
Filed July 10, 1959
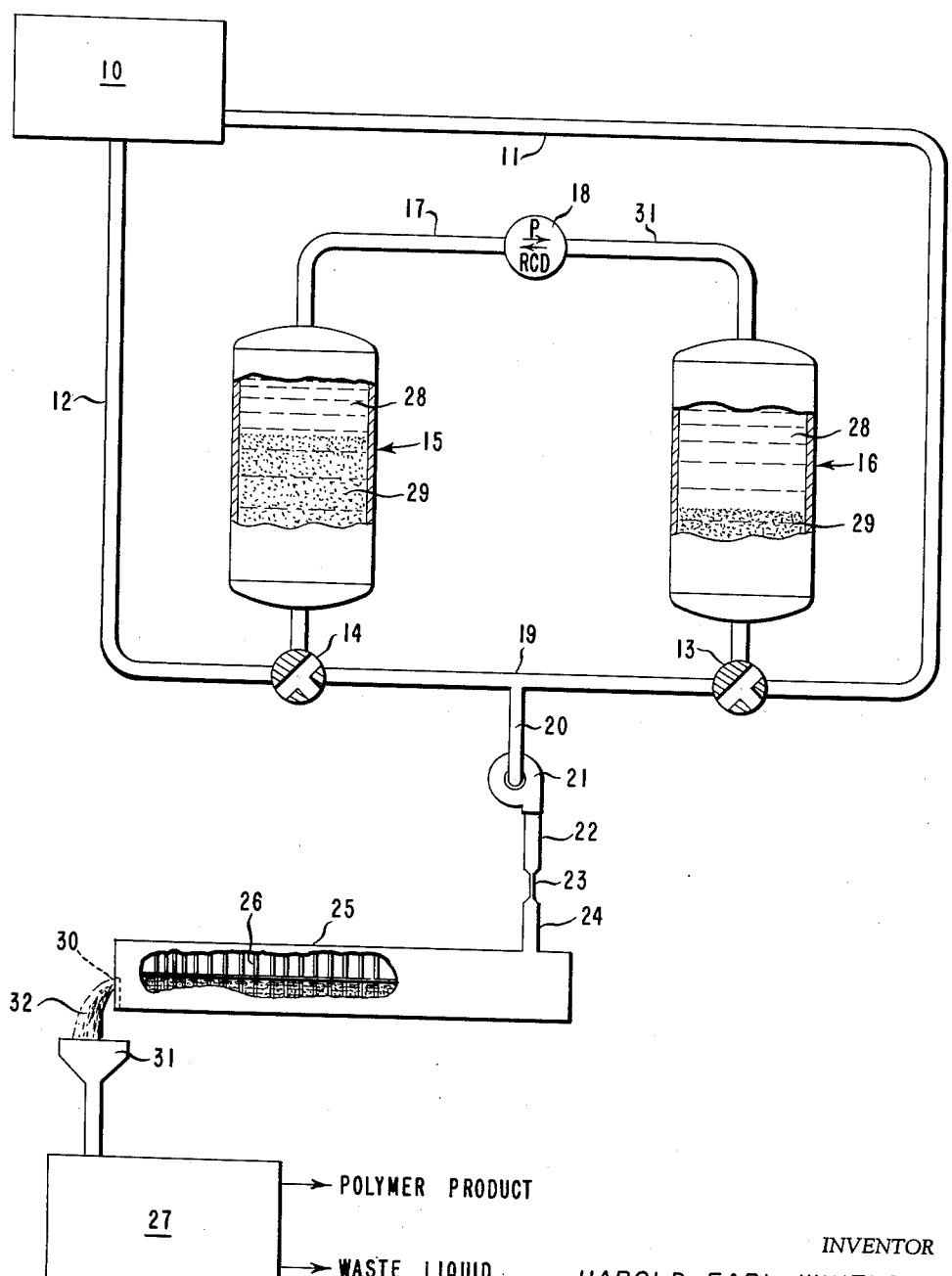
INVENTOR
HAROLD EARL WHITLOCK
BY Bernd W. Sandy
ATTORNEY

United States Patent Office 3,046,263
Patented July 24, 1962

3,046,263
COAGULATION OF COLLOIDAL POLYTETRA-
FLUOROETHYLENE DISPERSIONS
Harold Earl Whitlock, Wilmington, Del., assignor to E. I.
du Pont de Nemours and Company, Wilmington, Del.,
a corporation of Delaware
Filed July 10, 1959, Ser. No. 826,339
3 Claims. (Cl. 260—92.1)

This invention relates to the coagulation of colloidal polytetrafluoroethylene from an aqueous dispersion. More specifically, this invention relates to a novel coagulation process which permits operation on a continuous basis.

Solid tetrafluoroethylene polymers are useful in a variety of industrial applications, such as tubing and wire coating. Solid polytetrafluoroethylene, because of its extremely high melt viscosity, cannot be fabricated by melt fabrication techniques which are normally used for other thermoplastic resins. To overcome this difficulty several techniques have been developed, including the paste extrusion method described in U.S. Letters Patent 2,685,707 issued to W. E. Llewellyn and J. F. Lontz on December 27, 1955. Articles are fabricated, using the paste extrusion technique, by extruding an admixture of the polymer comprising polytetrafluoroethylene and a hydrocarbon lubricant, evaporating the hydrocarbon lubricant and heating the residue to a suitable sintering temperature for the tetrafluoroethylene polymer.

Polymer powder used in extrusion is generally obtained by coagulation of aqueous dispersions of polytetrafluoroethylene. Because the properties of the polymer powder are critical in the extrusion step, the preparation of the powder in the coagulation step must be carefully controlled. Excessive deformation of the polymer particles in the coagulation step will produce a polymer powder which will have poor extrusion characteristics. Once the spheroidal polymer particles have been deformed, they cannot be returned to their original condition, i.e. the process is irreversible. Therefore, any process selected for coagulation must necessarily be one which will produce minimum particle deformation in order that the polymer powder be useful as an extruding composition. In addition, commercial polytetrafluoroethylene fabricating techniques require a polymer which is free-flowing in the dry and unlubricated state.

Prior to the present invention, it had not been possible to prepare a free-flowing polymer powder which would meet the quality standards required for paste extrusion, except by batch coagulation. Like many commercial chemical operations, it was economically desirable to convert the coagulation step into a continuous process. It was found, however, that the process used in the batch coagulation was not adaptable to continuous operation since it produces polymer which was difficult to handle and gave poor yields.

It is an object of this invention to provide a continuous process for coagulating a colloidal dispersion of polytetrafluoroethylene. It is another object of this invention to provide a process which will produce polytetrafluoroethylene powder having good extrusion properties. Other objects will become apparent hereinafter.

The objects of the present invention are accomplished by a process which comprises subjecting an aqueous dispersion of polytetrafluoroethylene containing from 5 to 50 by weight percent polytetrafluoroethylene based on the total composition, to energy by (1) subjecting said dispersion to intense agitation, the amount of energy imparted by said intense agitation being in the range of 1 to 100 horsepower-seconds per gallon of said dispersion, (2) thereafter passing said dispersion through a capillary, the pressure drop across said capillary being in the range of 0.5 to 20 p.s.i., (3) thereafter subjecting said dispersion to agitation in the presence of air by imparting energy in the amount of 0.25 to 50 horsepower-seconds per gallon and (4) on separation from the aqueous phase, recovering a solid, granular, free-flowing polytetrafluoroethylene powder.

In the dispersion coagulation of polytetrafluoroethylene there are certain stages which, while not completely distinct, are sufficiently different that these stages are referred to in the art by special terms. Before coagulation, the dispersion is an aqueous colloidal suspension of the polymer containing a small amount of a dispersing agent. When agitation is applied the particles begin to agglomerate, but for several minutes there is no readily observable change in the properties of the suspension. The stage of the coagulation up to the point where a change is readily visible to the unaided eye is referred to as the "pre-gel stage." As the agitation is continued, a stage of agglomerate is reached wherein a gel of the polymer is formed which contains a large amount of occluded water. The polymer at this stage is water-wet and readily observable to the unaided eye. This stage is referred to by those in the art as the "gel stage"; polymer in this condition is referred to as "water-wet polymer." The polymer product which might be recovered in either the pre-gel or gel stages is not useful as a commercial composition. In addition, recovery of the polymer is difficult and expensive when in these stages since neither colloidal nor gelled materials can be easily separated from the liquid by decantation, filtration or the like. Additional agitation breaks up the gel structure into spheroidal agglomerates of the original dispersion particles. With still further agitation the agglomerates become non-water-wet and buoyant in the liquid as air displaces water in the pores of the agglomerate. This stage is referred to as the "post-gel" or "non-water-wet" stage. The agitation is normally continued for several minutes after the non-water-wet polymer is first formed, to insure that no colloidal or water-wet polymer contaminates the product. The recovered polymer is a granular and free-flowing powder useful in paste-extrusion applications. The polymer is, furthermore, easily separated from the waste liquid by filtration, decantation, or other like means.

In any coagulation system it is critical that the non-water-wet polymer product not be contaminated with colloidal or gelled polymer. Such contamination ruins the free-flowing properties of the polymer product which are essential to commercial extrusion processes as outlined hereinbefore. Contamination of the product with colloidal or gelled polymer also makes the separation of the waste liquid from the product less complete.

Following is a description by way of example and with reference to the accompanying drawing which is a diagrammatic flow sheet illustrating a preferred method for carrying out the present invention.

The aqueous polytetrafluoroethylene dispersion in storage tank 10 is drawn through line 11 and the three-way valve 13 into feed tank 16 by the reversible direction pump 18. This pump draws liquid hydrocarbon 28 out of feed tank 16, through line 31 and forces said hydrocarbon solvent through line 17 into feed tank 15 causing polymer dispersion 29 in feed tank 15 to flow through the three-way valve 14 into header 19 and thence through line 20 into centrifugal pump 21. When dispersion 29 in feed tank 15 becomes reduced to a low level, the position of three-way valves 13 and 14 and the pumping direction of reversible pump 18 are simultaneously changed, so that the aqueous polytetrafluoroethylene dispersion in storage tank 10 is drawn through line 12 and the three-way valve 14 into feed tank 15 by the reversible direction pump 18. This pump draws liquid hydrocarbon solvent 28 out of feed tank 15 through line 17 and forces the hydrocarbon solvent 28 through line 31 into feed tank 16 causing the polymer dispersion 29 in feed tank 16 to flow through three-way valve 13 into header 19 and thence through line 20 into centrifugal pump 21. When the level of the dispersion 29 in feed tank 16 becomes reduced to a low level the three-way valves 13 and 14 and the pumping direction of the reversible direction pump 18 are returned to their original positions. This reversal is continued periodically, thereby establishing a continuous and even flow to the centrifugal pump 21.

This arrangement comprises one method of supplying a continuous flow of dispersion to the centrifugal pump 21. Equivalent systems suitable for feeding a continuous stream of dispersion to the centrifugal pump 21 are such as do not exert substantial shear on the polymer dispersion prior to introduction into the centrifugal pump. Useful methods include the centrifugal pump as the motive force, gravity feed, constant-pressure feed and other positive displacement methods. All elbows and valves should be streamlined and the Reynolds' number in the lines preferredly should not exceed 2100 in order to minimize clogging of the lines with coagulated dispersion. The dispersion should be at a temperature of 5 to 60° C. when delivered to the centrifugal pump, and preferably at a temperature of 20 to 30° C. The dispersion in this illustration was at a temperature of 25° C. The dispersion leaves centrifugal pump 21 through line 22, passes through the capillary 23, a pipe of a reduced diameter, and hence through line 24 into horizontal cylindrical agitation tank 25. In this embodiment a centrifugal pump 21 is the means used to supply the intense agitation to the dispersion. Other suitable means may be employed if desired. For economic reasons it is generally desirable to employ a centrifugal pump as the means for supplying the intense agitation, since suitable pumps are commercially available. Generally, the centrifugal pump 21 should have an impeller to pump cage clearance in the range of $1/16$ to 1 inch and a linear impeller tip speed of 2 to 50 feet per second. The amount of energy imparted to said dispersion in said centrifugal pump being in the range of 1 to 100 horsepower-seconds per gallon. It is preferred to use a centrifugal pump with an impeller to pump cage clearance of $1/8$ inch and a linear impeller tip speed of 21 feet per second. The average residence time of the dispersion in the pump should be in the range of 0.5 to 5 seconds and preferably about 2 seconds. A plurality of pumps may also be used, feeding off header 19 or separate headers. For each centrifugal pump 21 a single or a plurality of capillaries 23 may be used. It is preferred to use capillaries with a diameter in the range of $1/16$ to $1/4$ inch and a length of $1/16$ to 1 inch imparting a pressure drop of 0.5 to 20 p.s.i. In general, a single large capillary does not provide as good results as several smaller capillaries. In a preferred embodiment of the invention, a means is provided to remove coagulated polymer which may build up in the capillary 23.

The dispersion in agitation tank 25 is agitated by the multibladed agitator 26 rotated by a motor (not shown). Products 32 flow out of the agitation tank 25 over weir 30 and into product separator 27 where the polymer product is recovered from the waste liquid. In a preferred embodiment of this invention the length to diameter ratio of the agitation tank is 10:1. Generally it is desirable to employ an agitation tank with large length to diameter ratio so that end-to-end mixing will be minimized. With the weir 30 maintaining the liquid level at the midpoint of the horizontal agitation tank 25, a hold-up time of 0.5 to 10 minutes is preferred. Many configurations of the multibladed agitator are operable in this invention and will be apparent to those skilled in the art. In the illustrated embodiment of the invention the agitator has 56 sets of four blades, $1/4$D long set 90° apart and aligned along the axis of the shaft such that each set is spaced $3/16$D apart, center to center, where D is the inside diameter of the agitation tank 25. The agitator shaft in this embodiment is $1/4$D making the agitator blades to tank wall clearance $1/8$D. The agitator should be driven at a speed of at least 400 r.p.m. and preferably about 600 to 900 r.p.m. which causes the slurry to be thrown against the upper surfaces of the tube and promotes good aeration. The process of the present invention is very flexible and the amount of shear applied to the polymer may be varied in each of the centrifugal pumps 21, the capillary 23 and the agitation tank 25 such that the total amount of shear imparted to the dispersion remains approximately constant; in general, however, it is preferred to have the dispersion in the gel-stage when it reaches the agitation tank 25. By properly adjusting the shear applied by each means, the product characteristics can be varied as desired.

The present invention is further illustrated by the following examples.

*Example 1*

Thirty pounds per hour of an aqueous colloidal dispersion of polytetrafluoroethylene at 25° C. containing 12% polytetrafluoroethylene by weight, based on the total composition, was forced through a centrifugal pump having an impeller to pump cage clearance of $1/8$ inch, a linear impeller tip speed of 21 feet per minute and a hold-up time of approximately 2 seconds. This pump was operated at 1500 r.p.m. which applied approximately 10 horsepower-second of energy per gallon of dispersion. The dispersion then passed through a capillary 0.096 inch in diameter and $7/32$ inch in length and thence to a stirred horizontal cylindrical tank equipped with a multi-bladed agitator extending the length of the tank. The pressure drop across said capillary being 2 p.s.i. The liquid level was maintained at approximately 50% of capacity by means of a weir on one end of said tank. The dispersion in the gel stage as it left the capillary flowed into said tank at one end of said tank, and the products left the other end of said dispersion in said tank being approximately 4 horsepower-second per gallon of dispersion. The tank was 40 inches long, 4 inches inside diameter, and constructed of smooth glass. The agitator was constructed of stainless steel and had 56 sets of 4 blades 1 inch long set 90 degrees apart in a plane perpendicular to the agitator shaft, said sets of four blades being spaced $3/4$ inch apart along the axis of said agitator shaft, said agitator shaft being 1 inch in diameter. The products which overflowed the weir were separated into polymer product and waste liquid by decantation and filtration. A sample of the polymer powder was dried at 120° C. for one day. The product was a white, solid, granular, free-flowing powder having an average particle size of 635μ. The mother liquid was clear, indicating the recovery was good. Nine-hundred grams of the polymer powder was lubricated by admixing it with 19 weight percent, based on the total composition, of petroleum naphtha. The mixture was placed in a closed glass jar, rolled slowly for 15 minutes, and then allowed to condition for 16 hours at room temperature to distribute the lubricant evenly throughout the polymer. The lubricated sample was made into a cylindrical preform and extruded using a Jennings Machine Corp. 2½ inch diameter wire-coating extruder. The extrusion lubricant was evaporated and the wire coating sintered at 410° C. for 1.4 minutes. There was recovered a 10 mil coating of polymer on a 15 mil diameter stranded wire base. To determine the quality of the polymer for coating purposes, the coating is examined for flaws and the average acceptable length and the wire yield are calculated. The "average acceptable length" is defined as the average length in feet of flaw-free lengths greater than 50 feet. The "wire yield" is defined as the ratio, expressed as a percentage, of the sum of lengths of flaw-free wire longer than 50 feet to the total length extruded. The polymer of this example exhibited an average acceptable length of 193 and 119 feet as determined by duplicate tests. The wire yields for both tests were 99 percent.

*Example II*

Into a vertical cylindrical tank 12" high and 8" in diameter was charged 4500 ml. of an aqueous dispersion at 25° C. containing 12% polytetrafluoroethylene by weight of the total composition. The dispersion was stirred by a simple turbine stirrer having a blade width of 1 inch, a blade length of 2½ inches and a blade pitch of 30 degrees from the vertical. The stirrer was driven by an air motor at 425 r.p.m. In about 3¼ minutes the particles had agglomerated to the gel stage. A half minute later the gel structure began breaking up into agglomerates which become non-water-wet polymer. Stirring was continued for 3 minutes more to insure good recovery and to insure that the polymer product was not contaminated by water-wet or colloidal polymer. A white, granular, free-flowing powder was obtained having an average particle size of 560µ. The polymer of this example exhibited average acceptable lengths of 76 and 168 as determined by duplicate tests. The wire yields for these tests were 82 and 87% respectively.

*Example III*

Essentially the same equipment was used as in Example II except the dispersion at 25° C. was continuously fed at the bottom of the reactor tank with a hold-up time of approximately 14 minutes. The polymer was recovered from the product stream by decantation and filtration. The mother liquor had an opaque appearance indicating poor recovery of the polymer. The polymer products contained water-wet gel. After about 10 minutes of operation large amounts of polymer had built-up in the lower portion of the reactor and the process was discontinued. Substantially the same results were obtained by using a tubular reactor similar to the agitation tank described in Example I. The reactor was used in both the horizontal and vertical positions. With the reactor in the vertical position, substantially the same results were obtained feeding at the bottom and at the middle of said reactor.

As shown by Example III, the two main difficulties in converting batch coagulation to continuous coagulation are (1) the contamination of the polymer product with water-wet gel and (2) build-up of polymer in the reaction vessels. Of the two, the second was the more difficult to overcome. Some of the polymer particles have a tendency to exhibit continued growth, and finally the entire lower portion of the reactor is filled with a mass of polymer. This difficulty was encountered in simple one-stage reactors like those of Example III as well as in a series of reactors of similar type.

The present invention is useful in coagulating an aqueous dispersion of polytetrafluoroethylene resin continuously and in commercial quantities. Polymer prepared in accordance with the present invention is useful in the extrusion of film, fiber, tubing, pipe and similar articles. A particularly useful and valuable application for the polymers prepared in accordance with the present invention is the coating of wire.

I claim:

1. A process for the continuous coagulation of aqueous polytetrafluoroethylene by use of mechanical energy which comprises subjecting an aqueous, colloidal, dispersion of polytetrafluoroethylene containing 5 to 50 weight percent of polytetrafluoroethylene, based on the total composition to energy by (1) subjecting said dispersion to intense agitation, the amount of energy imparted to said dispersion by said intense agitation being in the range of 1 to 100 horsepower-seconds per gallon of dispersion; (2) thereafter passing said dispersion under sufficient applied pressure through a capillary pipe, the diameter of said capillary pipe being reduced to result in a pressure drop in the range of 0.5 to 20 p.s.i. and (3) thereafter subjecting said dispersion to agitation in the presence of air, the amount of energy applied to said dispersion being in the amount of 0.25 to 50 horsepower-seconds per gallon of dispersion and (4) on separation from the aqueous phase recovering a granular, free-flowing polytetrafluoroethylene powder.

2. A process of continuously coagulating, by use of mechanical energy, an aqueous colloidal dispersion comprising water and tetrafluoroethylene polymer, said polymer being present in the amount of 5% to 50% by weight of the total composition, which comprises imparting energy to said dispersion by (1) passing said dispersion through a centrifugal pump, the impeller to pump cage clearance of said pump being 1/16 to 1 inch, the linear impeller tip speed of said pump being 5 to 100 feet per minute, the average residence time in said pump being 0.5 to 5 seconds; (2) thereafter passing said dispersion under sufficient applied pressure through a capillary pipe having a reduced diameter of 1/16 to ¼ inch, the pressure drop across said capillary being 0.5 to 20 p.s.i.; (3) thereafter subjecting said dispersion to agitation in the presence of air, the amount of energy applied to said dispersion being 0.25 to 5 horsepower-seconds per gallon; and (4) recovering a normally solid, granular, free-flowing polytetrafluoroethylene powder.

3. The process of continuously coagulating, by use of mechanical energy, an aqueous colloidal dispersion of polytetrafluoroethylene polymer, said polymer being present in the amount of 12% by weight of the total composition, which comprises imparting energy to said dispersion by (1) passing said dispersion through a centrifugal pump, the impeller to pump cage clearance of said pump being ⅛ inch, the linear impeller tip speed of said pump being 21 feet per second, the average residence time in said pump being 2 seconds; (2) thereafter passing said dispersion under sufficient applied pressure through a capillary pipe having a reduced diameter of 0.096 inch, the pressure drop across said capillary being 2 p.s.i.; (3) thereafter subjecting said dispersion to agitation in the presence of air, the amount of energy imparted to said dispersion by said agitation being 4 horsepower-seconds per gallon, and (4) recovering a normally solid, granular, free-flowing polytetrafluoroethylene powder.

References Cited in the file of this patent

UNITED STATES PATENTS

| | | |
|---|---|---|
| 2,495,147 | Street | Jan. 17, 1950 |
| 2,593,583 | Lontz | Apr. 22, 1952 |